Patented Oct. 13, 1953

2,655,547

UNITED STATES PATENT OFFICE 2,655,547

PRODUCTION OF ALKYLPHENOLS

Fred Bryner, Midland, Mich., assignor to The Dow Chemical Company, Midland, Mich., a corporation of Delaware No Drawing. Application June 2, 1952, Serial No. 291,319

15 Claims. (Cl. 260—620)

This invention relates to the production of alkylated phenols by the introduction of alkyl substituents into the nucleus of mono-hydroxybenzenes and is particularly concerned with a method of producing ortho-tert-alkylphenols.

Several processes have been proposed for producing ortho-tert-alkylphenols but none give high enough yields to be commercially feasible and all are complicated by the formation of extraneous products, particularly isomeric ethers, which interfere with product purification. In addition to low yields and ether formation, most of these processes suffer from other disadvantages in that they require large amounts of non-selective catalysts and sometimes considerable quantities of organic solvents as well, both of which are expensive and difficult to remove from the reaction products.

The foregoing objections are overcome in the process of the present invention which employs no organic solvents and only small amounts of a highly selective catalyst to produce ortho-tert-alkylphenols in high yields and free from contaminating ethers.

According to the process of the invention, ortho-tert-alkylphenols are produced by contacting a phenol at a temperature and for a time sufficient to permit extensive reaction with a tertiary base olefin, or olefin hydrohalide, in the presence of a phosphorus oxyhalide catalyst. The reaction is usually carried out batchwise by charging the phenolic compound and catalyst into a reaction vessel, rapidly stirring the contents thereof, heating to the desired temperature, and adding the alkylating agent, e. g. a tertiary base olefin, at a rate at which substantially complete reaction is obtained.

The invention depends on the discovery that small amounts of phosphorus oxyhalide catalyst, such as phosphorus oxychloride or bromide, will catalyze the alkylation of phenols to produce large proportions of ortho-tert-alkylphenols. A very small amount of oxyhalide catalyst, particularly phosphorus oxychloride, is exceptionally effective for catalyzing the desired reaction. The effective concentration of catalyst based on the weight of the phenol employed is as low as 0.1 per cent. In the reaction of isobutylene with phenol, yields greater than 60 weight per cent ortho-tert-butylphenol based on the phenol consumed have been obtained employing only 0.6 per cent $POCl_3$ catalyst. The preferred range of catalyst concentration is usually from 0.2 to 5.0 per cent of the phenol charged, although concentrations as high as 10 per cent may be employed. Higher concentrations of catalyst cause rearrangement of ortho to para isomers and catalyze the polymerization of olefins at the expense of the alkylation reaction.

The phenols which may be used in this process contain no more than one nuclear substituent ortho to the hydroxy group. More specifically, they are mono-hydroxybenzenes which may be substituted in one or more positions of the benzene ring but must be unsubstituted in at least one position ortho to the hydroxy group. Such phenols are, for example, phenol itself, the three cresols, the xylenols, chlorophenols, phenylphenols, cyclohexylphenols, and the like. The extreme ortho-directing effect of the oxyhalide catalysts is particularly noticeable with those phenols in which the para position is unsubstituted.

The alkylating agents of the present process contain from four to seven carbon atoms in the molecule and are tertiary base olefins, such as isobutylene and isoamylene, and tertiary alkyl halides, such as tert-butyl chloride and tert-amyl chloride. The term tertiary base olefins as used herein refers to aliphatic hydrocarbons containing at least one double bond in the molecule which may be hydrohalogenated to give rise to a molecule containing a tertiary carbon atom. It is generally preferable to use tertiary base olefins themselves rather than tertiary alkyl halides.

The ratio of organic reactants employed in the alkylation process is preferably greater than one molecular proportion of the phenolic compound to one molecular proportion of alkylating agent, e. g. isobutylene. Mole ratios approximating 3 moles of the phenol to 1 mole of the alkylating agent are usually preferred for maximum conversions and yields of monoalkylated phenols containing a large proportion of ortho isomer. As the molecular preponderance of the phenol is increased, e. g. from 3 to 1 to 10 to 1, the proportion of ortho isomer increases slightly.

Pressures closely approximating atmospheric and temperatures below 200° C. are satisfactory for achieving the desired results of the reaction. Either subatmospheric or superatmospheric pressures may be employed in the alkylation process. Suitable alkylation temperatures range from 30° to 200° C. with temperatures in the range of 50° to 160° C. usually employed. As shown hereinafter in the examples, changing the reaction temperature within the latter range apparently has little effect on the conversion and yield of ortho-tert-butylphenol when reacting one mole of isobutylene with 3 moles of phenol in the presence of 0.6 per cent POCl₃ based on the weight of phenol.

The process of the invention may be run continuously but is usually carried out batchwise by charging the phenolic compound and catalyst into a reaction vessel, rapidly stirring the contents thereof, heating to the desired temperature, and adding the alkylating agent, e. g. a tertiary base olefine, at such a rate as to achieve maximum input and still effect substantially complete reaction with the phenol. Since the low molecular weight and more commonly used alkylating agents of the invention, particularly the tertiary base olefins, are gases at the temperatures and pressures generally employed for the alkylation reaction, it is common practice to pass a stream of the alkylating gas into the phenolic compound as fast as the gas can be absorbed. Unreacted alkylating agent may be collected in a suitable manner and reintroduced into the reaction vessel if desired. Heating should not be continued unduly long after essentially all of the alkylating agent has been consumed since prolonged heating beyond this stage in the presence of phosphorus oxyhalide catalyst generally causes rearrangement of the reaction products.

The reaction products are generally separated by fractional distillation. Prior to fractionation, it is usually preferred to treat the crude products with sufficient strong aqueous sodium hydroxide to neutralize the acid constituents, such as phosphorus oxychloride. Sometimes the catalyst may be removed from the products by a flash distillation at reduced pressure rather than by neutralization. Unless the catalyst is effectively deactivated or removed from the reaction product before fractional distillation, rearrangement will usually occur.

The following examples serve to illustrate the process of the present invention and the efficiency of the phosphorus oxyhalide catalysts in promoting the condensation of various phenols with tertiary base olefins or tertiary alkyl halides to form large proportions of ortho-tert-alkylphenols.

Example 1

The strongly ortho-directing phosphorus oxyhalide catalysts of the invention are compared to conventional aluminum halide catalysts in the following two runs in which phenol and isobutylene were reacted under similar conditions except that the runs were catalyzed by (A) phosphorus oxychloride and (B) aluminum chloride, respectively.

A

Tert-butylphenols containing a large proportion of ortho-tert-butylphenol were produced according to the invention by adding one molecular proportion of isobutylene to 3 molecular proportions of phenol at 55° to 60° C. in the presence of 0.6 per cent POCl₃ catalyst based on the weight of phenol as hereinafter described.

Into a closed reaction vessel consisting of a 10 gallon ceramic-lined kettle equipped with a sparger, stirrer, heating means, and temperature measuring device was charged 42.75 pounds (0.454 pound mole) of phenol. The reaction vessel was first purged with nitrogen and then 0.253 pound of POCl₃ (0.6% on the weight of phenol) was added. Stirring was begun and heat was applied to raise the temperature to 55° C. Thereupon 8.625 pounds (0.151 pound mole) of 98.7 per cent isobutylene was passed into the reactor during a period of 52 minutes while the reaction mixture was maintained at 55° to 60° C. To insure essentially complete reaction of isobutylene and phenol, the temperature of the reaction mixture was held at 55° to 58° C. for one hour after all of the isobutylene had been added. At the end of this time, a colorless reaction product weighing 51.5 pounds was drained from the kettle and neutralized with 0.405 pound of 50 per cent aqueous sodium hydroxide. A portion of the neutralized reaction product was then fractionally distilled. No ethers were observed. The yields of tert-butylphenols appear in the accompanying table and are based on the unrecovered phenol which is the phenol consumed plus losses.

B

Another run not in accord with the invention was conducted by adding 1 molecular proportion of isobutylene to 2.7 molecular proportions of phenol at a temperature of 57° to 64° C. in the presence of 1.25 per cent anhydrous Al₂Cl₆ catalyst based on the weight of phenol. The reaction was carried out in a similar manner to run A described above. The reaction product was washed first with dilute hydrochloric acid and then with water to remove most of the catalyst. Residual HCl was thereafter neutralized and the reaction product fractionally distilled. The yields of ortho- and para-tert-butylphenols which appear in the table are based on the unrecovered phenol as hereinbefore defined.

| Run No. | Catalyst | Percent yield based on phenol unrecovered | |
|---|---|---|---|
| | | Ortho | Para |
| A | POCl₃ | 51.8 | 21.5 |
| B | Al₂Cl₆ | 1.8 | 94.9 |

Example 2

In the preparation of tert-butylphenols containing a large proportion of o-tert-butylphenol, the effect of mole ratio of reactants is shown in the accompanying table by comparing three runs wherein different proportions of isobutylene were added to phenol at 55° to 60° C. using 0.6 per cent POCl₃ catalyst based on the weight of phenol according to the procedure described in Example 1A. In every run, essentially all of the isobutylene was consumed. Furthermore, after each run the catalyst was neutralized prior to distillation. No ethers were identified in the reaction products from any of the runs. The yields of tert-butylphenols are based on the unrecovered phenol which is the phenol consumed plus losses.

| Run No. | Mole ratio of phenol to isobutylene | Percent yield based on phenol unrecovered | | |
|---|---|---|---|---|
| | | Ortho | Para | Di |
| A | 3:1 | 51.8 | 21.5 | 19.0 |
| B | 5:1 | 56.3 | 21.7 | 5.0 |
| C | 10:1 | 61.0 | 19.2 | 6.0 |

Example 3

The effect of temperature is illustrated by three runs made at different temperatures wherein 1 molecular proportion of isobutylene was added to 3 molecular proportions of phenol in the presence of 0.6 per cent POCl₃ catalyst based on the weight of phenol according to the procedure described in Example 1A. Following the heating period, the reaction mixture was neutralized and fractionally distilled. From the data in the following table, it is apparent that the yield of o-tert-butylphenol is affected only slightly by temperature changes between 44° and 157° C. when the quantity of catalyst is in the order of 0.6 per cent of the weight of phenol.

| Temperature, °C. | Percent yield based on phenol unreacted | | |
|---|---|---|---|
| | Ortho | Para | Di |
| 44–52 | 50.2 | 26.3 | 18.5 |
| 100–110 | 47.5 | 31.3 | 17.4 |
| 150–157 | 45.8 | 39.6 | 10.5 |

Example 4

Phosphorus oxybromide is also an effective catalyst for producing alkylphenol compounds containing a large proportion of the ortho isomer. In the preparation of tert-butylphenols, 1 molecular proportion of isobutylene was added to 3.3 molecular proportions of phenol at 55° to 60° C. using 0.2 per cent $POBr_3$ based on the weight of phenol but otherwise conducted in accord with the procedure of Example 1A. The reaction mixture was neutralized and fractionally distilled. The per cent yields of tert-butylphenols based on phenol unrecovered are as follows:

| Ortho | Para | Di |
|---|---|---|
| 42.7 | 24.7 | 16.6 |

Example 5

The preparation of tert-amylphenols containing a large proportion of ortho-tert-amylphenol is hereinafter described. One molecular proportion of isoamylene was added to three molecular proportions of phenol according to the general procedure of Example 1A at 100° to 110° C. employing 1.0 per cent $POCl_3$ catalyst based on the weight of phenol. The reaction mixture was neutralized and fractionally distilled. Based on the phenol unrecovered, the per cent yields of tert-amylphenols are given below:

| Ortho | Para | Di |
|---|---|---|
| 52.2 | 32.6 | 7.0 |

Example 6

Tertiary-alkyl halides may also be reacted with phenolic compounds according to the invention. One molecular proportion of tert-butyl chloride was added to 3 molecular proportions of phenol at 55° to 60° C. using 0.6 per cent $POCl_3$ catalyst based on the weight of phenol according to the general procedure of Example 1A. After neutralizing the reaction mixture, it was fractionally distilled. The per cent yields of tert-butylphenols based on phenol unrecovered are given below:

| Ortho | Para | Di |
|---|---|---|
| 36.8 | 53.8 | 3.9 |

Example 7

Ortho-cresol was reacted with isobutylene to produce 6-tert-butyl-o-cresol as hereinafter described. The reaction was carried out according to the procedure of Example 1A by adding 1 molecular proportion of isobutylene to 3 molecular proportions of o-cresol at a temperature of 58° to 61° C. using 0.58 per cent $POCl_3$ based on the weight of o-cresol. Unlike the preceding examples in which isobutylene was reacted with phenol in the presence of $POCl_3$ catalyst, not all of the isobutylene was consumed in the reaction. Although 0.97 mole of isobutylene was heated with 2.9 moles of o-cresol, only 0.814 mole of isobutylene reacted. Following the heating period, the reaction mixture was neutralized and fractionally distilled. There was obtained 40.9 grams of 6-tert-butyl-o-cresol boiling at 124° to 129° C. at 25 mm. of mercury absolute pressure and having a freezing point of 22.5° C. The yield of this material was 60 per cent based on the unrecovered o-cresol. The recrystallized product had a freezing point of 27.7° C. and was identified by infrared analysis as 6-tert-butyl-o-cresol.

Example 8

Ortho-chlorophenol was reacted with isobutylene according to the invention. The reaction was conducted similarly to the procedure employed in the preceding examples by adding 1 molecular proportion of isobutylene to 3 molecular proportions of o-chlorophenol at a temperature of 71° to 78° C. using 5.0 per cent $POCl_3$ based on the weight of o-chlorophenol. Thereafter, the reaction mixture was topped through a still column at 25 mm. of mercury absolute pressure at a pot temperature up to 80° C. to remove low boiling material and most of the $POCl_3$. After the residual $POCl_3$ was neutralized, the higher boiling product was fractionally distilled. Based on the o-chlorophenol unrecovered, the per cent yields appear below:

| | Percent |
|---|---|
| 2-tert-butyl-6-chlorophenol | 20.9 |
| 4-tert-butyl-2-chlorophenol | 32.1 |

Example 9

Ortho-phenylphenol was reacted with isobutylene according to the general procedure of Example 1A. The reaction was carried out by adding 1 molecular proportion of isobutylene to 3 molecular proportions of o-phenylphenol at a temperature of 70° to 78° C. in the presence of 0.6 per cent $POCl_3$ based on the weight of o-phenylphenol in a similar manner to the procedure used in previous examples. The $POCl_3$ catalyst and a small amount of low boiling material were distilled out of the reaction mixture at reduced pressure and the material which remained was fractionally distilled. The per cent yields based on o-phenylphenol unrecovered are as follows:

| | Percent |
|---|---|
| 2-tert-butyl-6-phenylphenol | 44.8 |
| 4-tert-butyl-2-phenylphenol | 35.9 |

What is claimed is:
1. In a process for making an alkyl phenol by the reaction of a compound of the group consisting of tertiary base olefins and tertiary alkyl halides with a phenol containing not more than one nuclear substituent ortho to the hydroxy group, the method of insuring formation predominantly of ortho alkylated product which comprises effecting the alkylation in the presence of phosphorus oxyhalide as catalyst.

2. A process for the production of tert-alkylphenols containing a large proportion of an ortho-tert-alkylphenol which comprises contacting at a temperature and for a time sufficient to effect substantially complete reaction, a phenol containing not more than one nuclear substituent ortho to the hydroxy group and a compound of the group consisting of tertiary base olefins and tertiary alkyl halides in the presence of a phosphorus oxyhalide catalyst.

3. A process according to claim 2 wherein the temperature is 30° to 200° C.

4. A process according to claim 3 wherein the mole ratio of the phenol to the alkylating agent is greater than 1:1.

5. A process according to claim 4 wherein the catalyst concentration based on the weight of the phenol is from 0.1 to 10 per cent by weight.

6. A process according to claim 5 wherein the catalyst is phosphorus oxybromide.

7. A process according to claim 5 wherein the catalyst is phosphorus oxychloride.

8. A process for the production of tert-alkylphenols containing a large proportion of an ortho-tert-alkylphenol which comprises bringing one molecular proportion of a compound of the group consisting of tertiary base olefins and tertiary alkyl halides containing from four to seven carbon atoms in the molecule into contact with greater than one molecular proportion of a phenol containing not more than one nuclear substituent ortho to the hydroxy group, in the presence of 0.1 to 10 per cent by weight of phosphorus oxychloride catalyst based on the weight of the phenol, at a temperature in the range of 30° to 200° C. for a time sufficient to effect substantially complete reaction.

9. A process for the production of tertiary-butylphenol compounds containing a large proportion of the ortho isomer which comprises bringing one molecular proportion of isobutylene into contact with greater than one molecular proportion of a phenol containing not more than one nuclear substituent ortho to the hydroxy group, in the presence of 0.1 to 10 per cent by weight of phosphorus oxychloride catalyst based on the weight of the phenol, at a temperature in the range of 30° to 200° C. for a time sufficient to effect substantially complete reaction, and recovering the ortho-tert-butylphenol compound so produced.

10. A process according to claim 9 for the production of tert-butylphenols containing a large proportion of ortho-tert-butylphenol wherein isobutylene is reacted with phenol.

11. A process according to claim 9 for the production of tert-butyl-o-cresols containing a large proportion of 6-tert-butyl-o-cresol wherein isobutylene is reacted with o-cresol.

12. A process according to claim 9 for the production of tert-butyl-o-phenylphenols containing a large proportion of 6-tert-butyl-o-phenylphenol wherein isobutylene is reacted with o-phenylphenol.

13. A process according to claim 9 for the production of tert-butyl-o-chlorophenols containing a large proportion of 6-tert-butyl-o-chlorophenol wherein isobutylene is reacted with o-chlorophenol.

14. A process for the production of tert-amylphenol compounds containing a large proportion of the ortho isomer which comprises bringing one molecular proportion of isoamylene into contact with greater than one molecular proportion of a phenol containing not more than one nuclear substituent ortho to the hydroxy group, in the presence of 0.1 to 10 per cent by weight of phosphorus oxychloride catalyst based on the weight of the phenol, at a temperature in the range of 30° to 200° C. for a time sufficient to affect substantially complete reaction, and recovering the ortho-tert-amylphenol compound so produced.

15. A process according to claim 14 for the production of tert-amylphenols containing a large proportion of ortho-tert-amylphenol wherein isoamylene is reacted with phenol.

FRED BRYNER.

References Cited in the file of this patent

Staudinger et al., Chem. Abstracts, vol. 20, page 2148 (1926).

Goswami et al., Chem. Abstracts, vol. 26, page 89 (1932).